United States Patent [19]

Waguri

[11] Patent Number: 5,612,617
[45] Date of Patent: Mar. 18, 1997

[54] FREQUENCY DETECTION CIRCUIT

[75] Inventor: Shin-Ichi Waguri, Tokyo, Japan

[73] Assignee: NEC Corporation, Tokyo, Japan

[21] Appl. No.: 389,054

[22] Filed: Feb. 15, 1995

[30]   Foreign Application Priority Data

Feb. 15, 1994   [JP]   Japan ................................ 6-018020

[51] Int. Cl.$^6$ .................................................. H04L 27/22
[52] U.S. Cl. ..................... 324/76.45; 324/76.31; 324/76.46
[58] Field of Search ........................... 324/76.45, 76.31, 324/76.46

[56]   References Cited

U.S. PATENT DOCUMENTS

| | | | |
|---|---|---|---|
| 4,385,208 | 5/1983 | Tow | 324/76.31 |
| 4,492,917 | 1/1985 | Inami | 324/76.31 |
| 4,718,097 | 1/1988 | Uenoyama | 324/76.31 |
| 4,797,931 | 1/1989 | Furukawa | 324/76.31 |
| 4,904,930 | 2/1990 | Nicholas | 324/76.31 |
| 5,075,619 | 12/1991 | Said | 324/76.31 |

FOREIGN PATENT DOCUMENTS

| | | |
|---|---|---|
| 59-2503 | 1/1984 | Japan . |
| 63-155848 | 6/1988 | Japan . |

*Primary Examiner*—Maura K. Regan
*Assistant Examiner*—Jose M. Solis
*Attorney, Agent, or Firm*—Foley & Lardner

[57]   ABSTRACT

A circuit for detecting a particular frequency out of a signal coming in over a telephone line or similar communication path. The circuit has not only a band-pass filter having a frequency band to be detected but also band-pass filters covering frequency bands adjoining. A particular frequency is detected on the basis of the results of comparison of the output levels of the band-pass filters and reference levels.

2 Claims, 4 Drawing Sheets

FREQUENCY DETECTION CIRCUIT

BACKGROUND OF THE INVENTION

The present invention relates to a circuit for detecting a particular frequency out of a signal coming in over a telephone line or similar communication path and, more particularly, to a frequency detection circuit applicable to a facsimile terminal or similar data terminal using a telephone line.

It has been customary to detect a particular frequency component out of a signal received over, for example, a telephone line by using a band-pass filter, frequency detector, and controller. The band-pass filter has a pass band equivalent to the standard of the band width of a desired frequency. A signal from an input terminal is applied to the band-pass filter. The filter selectively delivers the input signal to the frequency detector. The frequency detector determines the power level of the input signal and, if it is higher than a predetermined level, sends a detection signal to the controller. In response, the controller determines that the desired frequency has been detected. However, such a frequency detection scheme has the following problem. Assume that the input signal coming in through the input terminal contains switching noise attributable to an exchange and extraneous noise introduced into a telephone line, e.g., the power level of noise contains substantially constant white noise without regard to frequency. Then, if the power level of the input signal is detected by the frequency detector via the filter, the controller is apt to determine that the desired frequency has been detected, despite that the frequency should not be detected.

Another conventional approach for frequency detection is to connect a plurality of band-pass filters each having a particular pass band to an input terminal in parallel, as taught in Japanese Patent Laid-Open Publication Nos. 59-2503 and 63-155848 by way of example. Although this kind of approach promotes effective frequency detection, it also involves detection errors attributable to white noise.

SUMMARY OF THE INVENTION

It is, therefore, an object of the present invention to provide a frequency detection circuit capable of detecting only a particular frequency even when frequency components (noise components) slightly lower in level than the particular frequency adjoin it.

A frequency detection circuit of the present invention has a plurality of band-pass filters for receiving an input signal input to the circuit, and each having a particular center frequency, a plurality of comparators respectively associated with the plurality of band-pass filters and for comparing the output signal levels of the respective band-pass filters with a reference level, and a controller for determining the frequency of the input signal on the basis of comparison signals output from the plurality of comparators and representative of the results of comparison.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENTS

Figure 1:
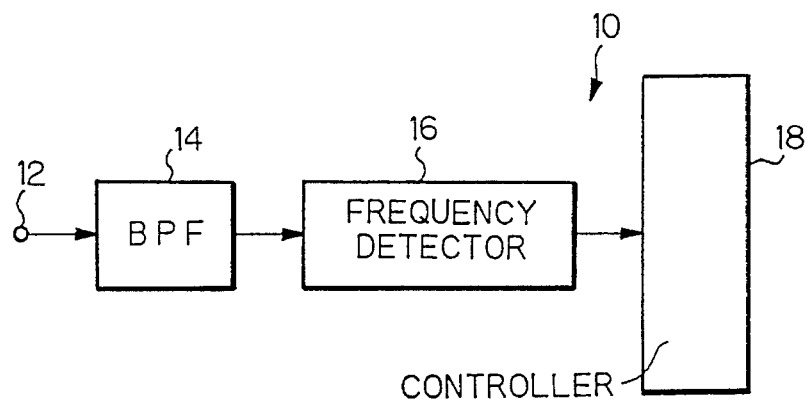
FIG. 1 is a block diagram schematically showing a conventional frequency detection circuit.

To better understand the present invention, a brief reference will be made to a conventional frequency detection circuit constructed to detect a particular frequency component out of a signal coming in over, for example, a telephone line. As shown, the circuit, generally 10, has a band-pass filter (BPF) 14, a frequency detector 16, and a controller 18. The BPF 14 has a pass band equivalent to the standard of the band width of the frequency to be detected. A signal from an input terminal 12 is applied to the BPF 14. The BPF 14 selectively delivers the input signal to the frequency detector 16. The frequency detector 16 determines the power level of the input signal and, if it is higher than a predetermined level, sends a detection signal to the controller 18. In response, the controller 18 determines that the desired frequency has been detected.

The conventional frequency detection circuit 10 described above has the previously discussed problem. Specifically, assume that the input signal coming in through the input terminal 12 contains switching noise attributable to an exchange and extraneous noise introduced into a telephone line, e.g., the power level of noise contains substantially constant white noise without regard to frequency. Then, if the power level of the input signal is detected by the frequency detector 16 via the BPF 14, the controller 18 is apt to determine that the particular frequency has been detected, despite that the frequency should not be detected.

Figure 2:
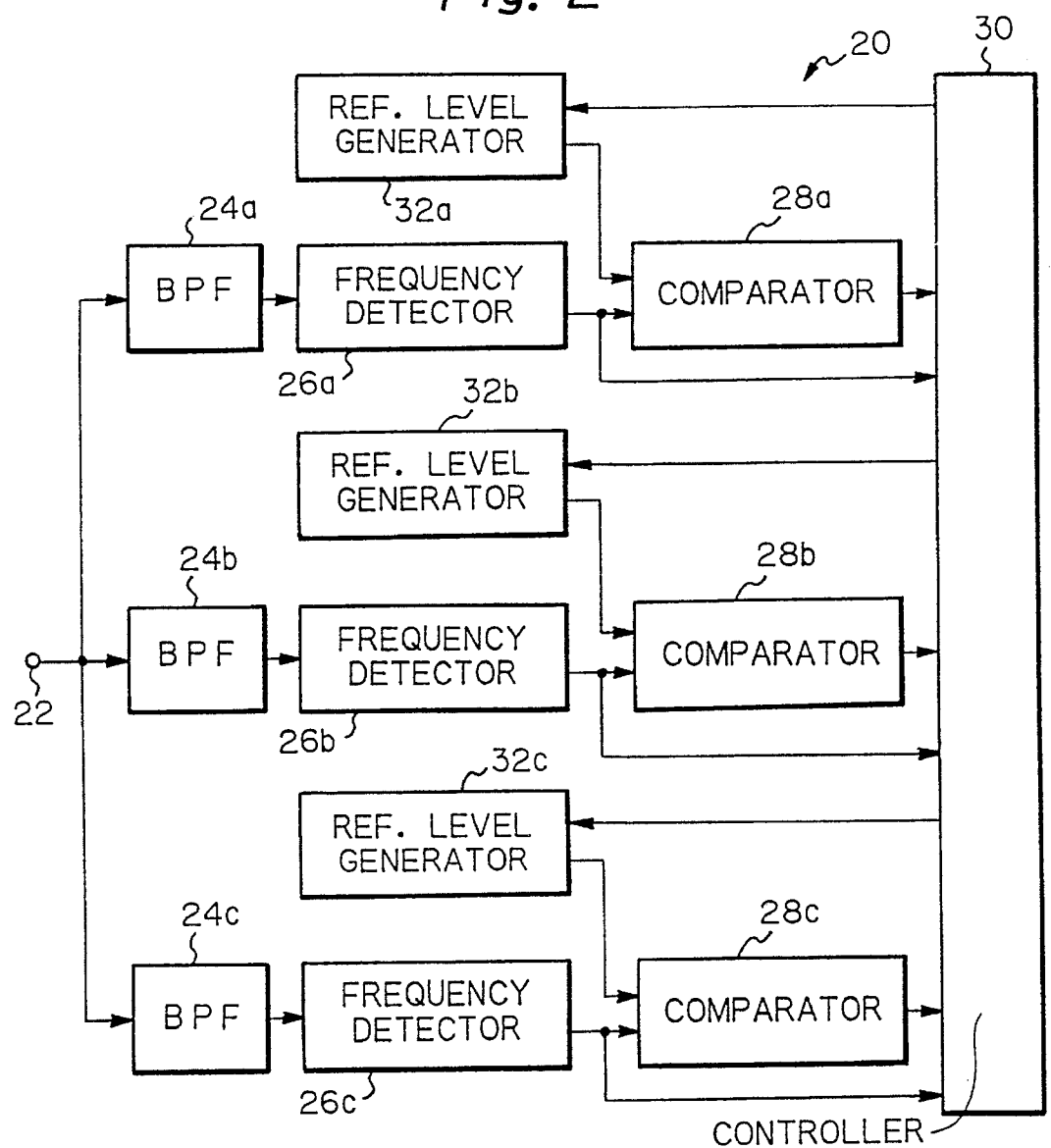
FIG. 2 is a block diagram schematically showing a frequency detection circuit embodying the present invention.

Referring to FIG. 2, a frequency detection circuit embodying the present invention is shown and generally designated by the reference numeral 20. As shown, the circuit 20 has an input terminal 22 connected to a telephone line. Three BPFs 24a, 24b and 24c are connected to the input terminal 22. It should be noted that the three BPFs are only illustrative and may be replaced with four or more BPFs, if desired. The BPFs 24a–24c have frequency bands which are different from each other in the frequency to pass. Specifically, the BPF 24a has a frequency band f0 which should be detected by the circuit 20. The BPF 24b has a frequency band fL outboard of and lower than the frequency band f0. The BPF 24c has a frequency band fH higher than the frequency band f0. Assume that the frequencies f0, fL and fH are close to each other.

Frequency detectors 26a, 26b and 26c are respectively connected to the BPFs 24a, 24b and 24c, and each detects the power levels of signals detected by the associated BPF. The outputs of the frequency detectors 26a–26c are respectively applied to comparators 28a, 28b and 28c while being applied to a controller 30 at the same time. Reference level generators 32a, 32b and 32c are also connected to the comparators 28a, 28b and 28c, respectively, and each generates particular reference level. The comparators 28a–28c compare the respective input power levels with the reference levels fed from the reference level generators 32a–32c. The output of each of the comparators 28a–28c, representing the result of comparison, goes high if the actual power level is higher than the reference level or goes low if otherwise. On receiving the outputs of the comparators 28a–28c and the outputs of the frequency detectors 26a–26c, the controller 30 determines whether or not the signal detected by the BPF 24a and detector 26a is significant. Further, the controller 30 is capable of changing the reference levels of the reference level generators 32a–32c.

In operation, a signal coming in through the input terminal 22 is fed to the BPFs 24a–24c. The BPF 24a passes a signal lying in the band f0 therethrough to the frequency detector 26a. The frequency detector 26a detects the power level of the input signal and delivers the detected power level to the comparator 28a. In response, the comparator 28a compares the power level with the reference level output from the reference level generator 32a. The resulting output of the comparator 28a is sent to the controller 30 and shows it whether the actual power level is higher or lower than the reference level. Such detection is also executed by the BPF 24b, frequency detector 26b, comparator 28b, and reference level generator 32b which cover the frequency band fL, and by the BPF 24c, frequency detector 26c, comparator 28c, and reference level generator 32c which cover the frequency band fH.

Figure 3:
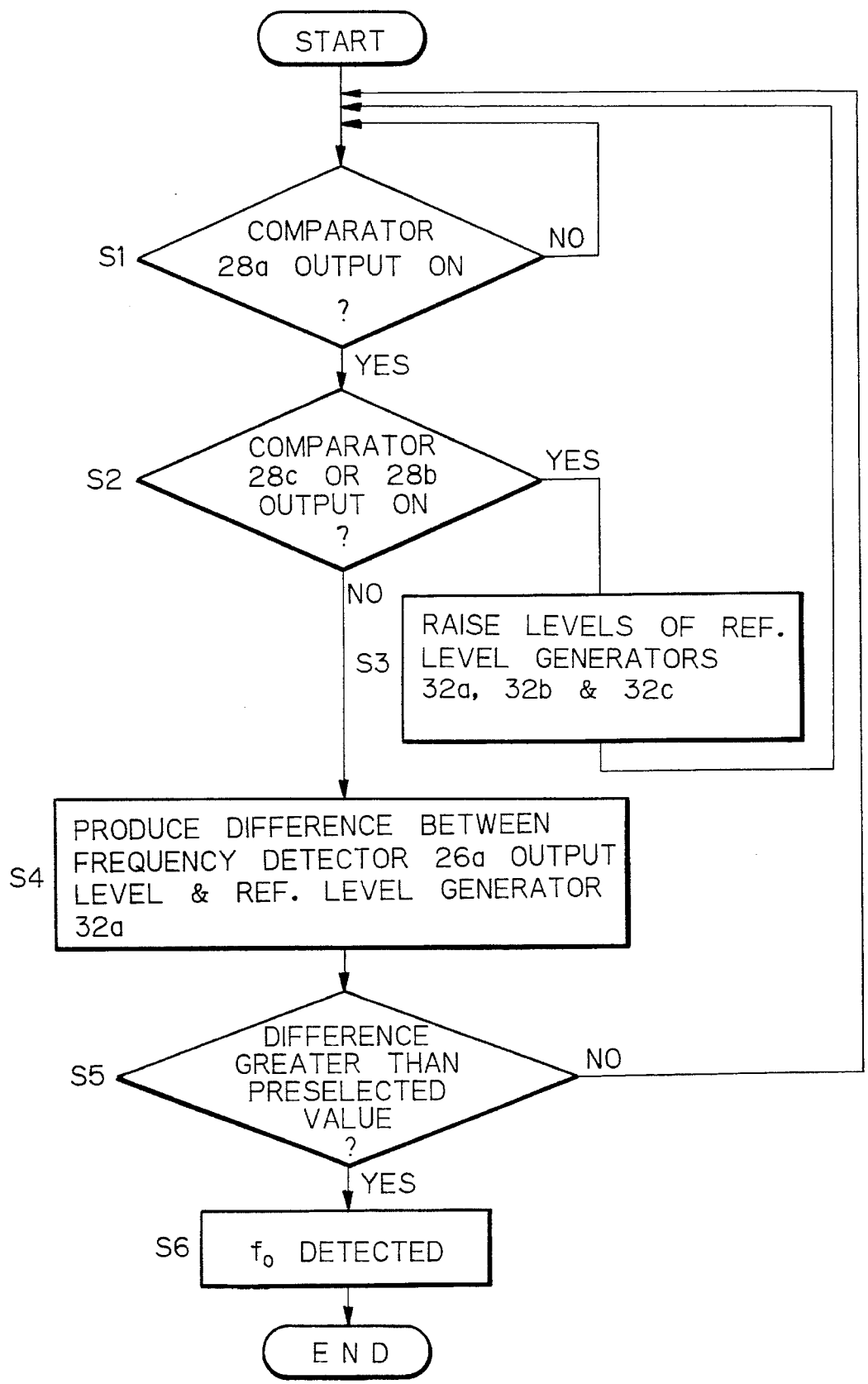
FIG. 3 is a flowchart demonstrating a specific operation of the embodiment.

FIG. 3 demonstrates a specific routine which the controller 30 executes for detecting the frequency band f0 in response to the outputs of the comparators 28a–28c and frequency detectors 26a–26c. First, the controller 30 determines whether or not the output of the comparator 28a is in a high level (ON), i.e., whether or not the input signal contains a component lying in the frequency band f0 (step S1). If the answer of the step S1 is YES, the controller 30 determines whether or not the output of another comparator 28b or 28c is in a high level (step S2). If either the output of the comparator 28b or that of the comparator 28c is in a high level (YES, step S2), the controller 30 raises the reference levels of the reference level generators 32a–32c (step S3) and then repeats the steps S1 and S2.

While the embodiment assigns a particular reference level to each of the reference level generators 32a–32c in matching relation to the noise condition of the telephone line or similar line, a single reference level may be assigned to all of them if the power level is substantially flat over the entire band.

If only the output of the comparator 28a is in a high level (NO, step S2), the controller 30 determines that the peak of the power level exists in the frequency band f0. Then, the controller 30 produces a difference between the power level from the frequency detector 26a and the reference level from the reference level generator 32a (step S4). Subsequently, the controller 30 determines whether or not the difference is greater than a preselected value (step S5). If the former is greater than the latter (YES, step S5), the controller 30 ends the routine, determining that the frequency band f0 has been detected (step S6). If otherwise, (NO, step S5), the controller returns to the step S1, determining that the frequency band f0 has not been detected.

Figure 4:
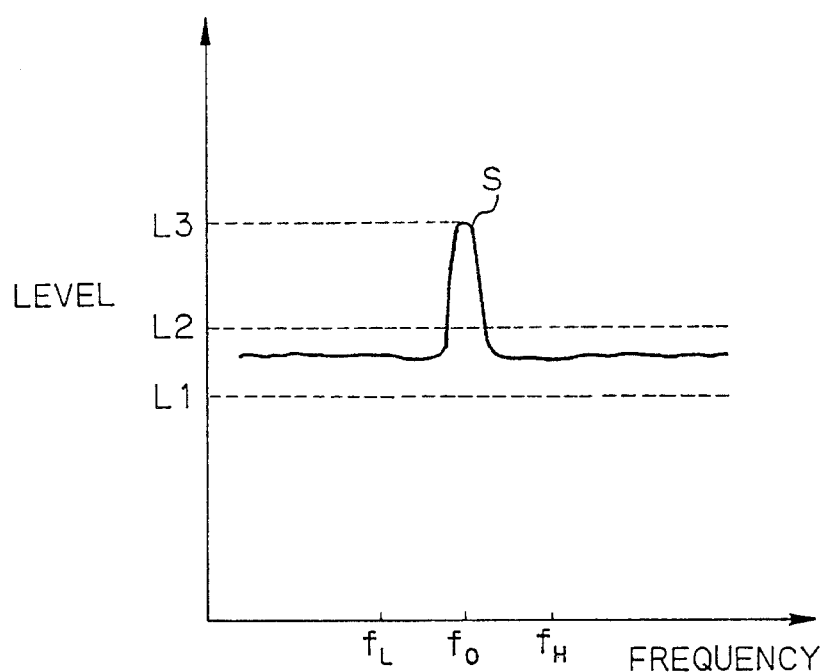
FIG. 4 is a graph showing a specific relation between the spectrum of an input signal and reference levels.

The above procedure will be described in relation to an actual spectrum. FIG. 4 shows a specific spectrum S of the signal input to the terminal 22 and a relation between the frequency bands f0, fL and fH and reference levels L1, L2 and L3. As shown, when the reference level L1 is set up, all the outputs of the comparators 28a, 28b and 28c associated with the frequency bands f0, fL and fH, respectively, go high. When the reference level is raised to L2 by the controller 30, only the output of the comparator 28a goes high to indicate that the power level is higher in the frequency band f0 than in the other frequency bands fL and fH. In addition, if the difference between the power level L3 and the reference level L2 in the frequency band f0 is greater than a predetermined value, it is determined that the frequency band f0 has been detected.

Figure 5:
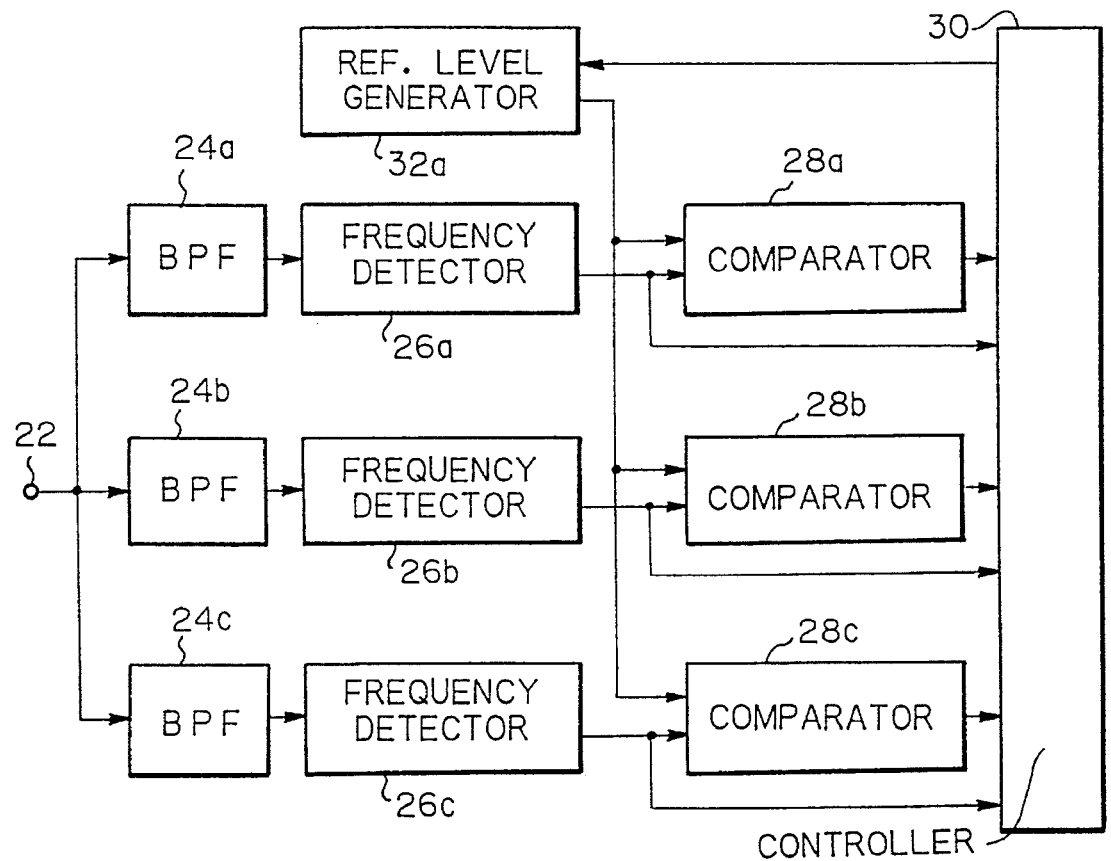
FIG. 5 is a block diagram schematically showing an alternative embodiment of the present invention.

FIG. 5 shows a modified or simplified form of the frequency detection circuit described above. As shown, the reference level detector 32a is connected to all the comparators 28a–28c in order to omit the other reference level generators 32b and 32c. The routine shown in FIG. 3 also applies to this modification.

Figure 6:
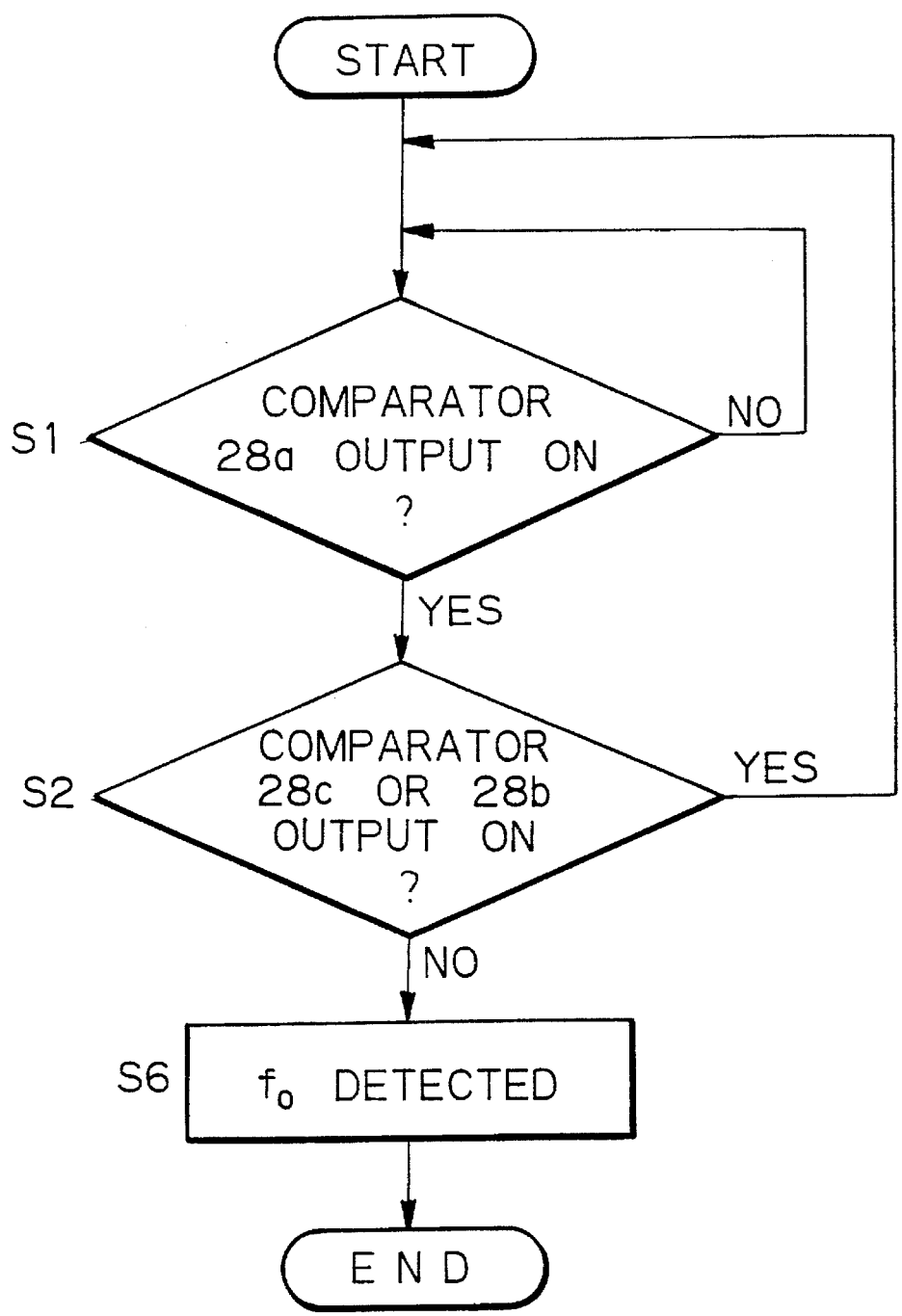
FIG. 6 is a flowchart representing another specific operation available with the embodiment shown in FIG. 2.

In the embodiments described above, the controller 30 may not use the power levels output from the frequency detectors 26a–26c or may not control the reference level generators 32a–32c in order to simplify the procedure. Specifically, as shown in FIG. 6, the steps S4 and S5 of FIG. 3 may be omitted. In this case, the frequency band f0 is detected when only the output of a particular comparator 28a goes high.

Of course, four or more combinations of BPF, frequency detector and comparator may be included in the circuitry to enhance accurate frequency detection.

In summary, it will be seen that the present invention provides a frequency detection circuit free from detection errors attributable to noise. This advantage is derived from the fact that not only a BPF having a particular frequency band to be detected but also BPFs covering frequency bands adjoining it are used. The particular frequency is detected on the basis of the results of comparison of the output levels of the BPFs and reference levels. Accurate frequency detection will be further enhanced if the level comparison is repeated after the reference levels have been controlled.

Various modifications will become possible for those skilled in the art after receiving the teachings of the present disclosure without departing from the scope thereof.

What is claimed is:

1. A frequency detecting circuit for detecting whether or not an input signal has a particular frequency, comprising:

first band-pass filter means for detecting said particular frequency of said input signal;

second band-pass filter means for detecting presence of another frequency which is different from said particular frequency in said input signal;

comparing means for comparing output signal levels of said first and second band-pass filter means with a reference level, and for generating first and second comparison signals when said output signal levels of said first and second band-pass filter means are higher than said reference level, respectively;

level changing means for changing said reference level when said comparing means outputs said first and second comparison signals at a same time;

difference producing means for producing, when only said first comparison signal is generated after a change of said reference level, a difference between a new reference level and the output signal level of said first band-pass filter means; and detecting means for detecting whether or not said difference is greater than a predetermined value.

2. A frequency detecting circuit, comprising:

first, second and third reference level generators having respective reference levels;

a controller coupled to the first, second and third reference level generators;

first, second and third comparators coupled to the controller and the first, second and third reference level generators, respectively;

first, second and third frequency detectors coupled to the controller and the first, second and third comparators, respectively;

wherein the controller determines whether an output of the first comparator is at a high level, said high level of the first comparator indicating that an input signal contains a frequency component lying in a predetermined frequency band, wherein when the output of the first comparator is at the high level, the controller determines whether an output of either the second or third comparators is at the high level, wherein when either the output of the second comparator or the third comparator is at the high level, the controller raises the respective reference levels of the first, second, and third reference level generators, and wherein when the output of the second comparator and the third comparator is not equal to the high level and the output of the first comparator is at the high level, the controller produces a difference signal based on an output of the first frequency detector and the respective reference level of the first reference level generator such that the frequency band is detected when the difference signal is greater than a preselected value.

* * * * *